US008805383B2

(12) United States Patent
Park

(10) Patent No.: US 8,805,383 B2
(45) Date of Patent: Aug. 12, 2014

(54) METHOD OF RELIABLE RADIO COMMUNICATION NETWORK DUPLICATION FOR HIGH SPEED TRAIN AND RADIO COMMUNICATION-BASED HIGH SPEED TRAIN CONTROL SYSTEM USING THE SAME

(75) Inventor: Man-Ho Park, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 75 days.

(21) Appl. No.: 13/619,713

(22) Filed: Sep. 14, 2012

(65) Prior Publication Data

US 2013/0150043 A1    Jun. 13, 2013

(30) Foreign Application Priority Data

Dec. 12, 2011 (KR) .......................... 10-2011-0133202

(51) Int. Cl.
*H04W 40/00*    (2009.01)

(52) U.S. Cl.
USPC ............................ 455/446; 455/436; 455/437

(58) Field of Classification Search
CPC ..... H04W 36/00; H04W 36/18; H04W 72/04; H04W 84/12; H04W 48/20
USPC ................. 455/450, 509, 11.1, 63.1, 69, 424, 455/436–437; 370/331, 280–281, 277; 343/711
See application file for complete search history.

(56) References Cited

U.S. PATENT DOCUMENTS

| | | | |
|---|---|---|---|
| 2004/0015275 A1 * | 1/2004 | Herzog et al. .................. | 701/19 |
| 2005/0176405 A1 | 8/2005 | Maeda | |
| 2007/0100517 A1 * | 5/2007 | Kim ............................... | 701/19 |
| 2007/0161347 A1 * | 7/2007 | Ma et al. ....................... | 455/11.1 |
| 2009/0174769 A1 * | 7/2009 | Katz .............................. | 348/143 |
| 2010/0074221 A1 * | 3/2010 | Hong et al. .................... | 370/331 |
| 2011/0088586 A1 * | 4/2011 | Huang et al. .................. | 104/287 |
| 2011/0230197 A1 * | 9/2011 | Wu et al. ....................... | 455/450 |
| 2011/0310852 A1 * | 12/2011 | Dimou et al. ................. | 370/332 |
| 2012/0091288 A1 * | 4/2012 | Rosetti et al. ............. | 246/415 R |
| 2012/0184317 A1 * | 7/2012 | Ihm et al. ...................... | 455/509 |
| 2012/0219084 A1 * | 8/2012 | Ihm et al. ...................... | 375/267 |
| 2012/0320817 A1 * | 12/2012 | Xu et al. ....................... | 370/315 |
| 2013/0053025 A1 * | 2/2013 | Lindoff et al. ................ | 455/424 |
| 2013/0069834 A1 * | 3/2013 | Duerksen ...................... | 343/711 |
| 2013/0143503 A1 * | 6/2013 | Li et al. ......................... | 455/63.1 |
| 2013/0163484 A1 * | 6/2013 | Ihm et al. ...................... | 370/280 |

FOREIGN PATENT DOCUMENTS

| | | |
|---|---|---|
| KR | 1020040054182 | 6/2004 |
| KR | 1020060041706 | 5/2006 |
| KR | 1020090060842 | 6/2009 |

* cited by examiner

*Primary Examiner* — Nathan Taylor
(74) *Attorney, Agent, or Firm* — Nelson Mullins Riley & Scarborough LLP; Anthony A. Laurentano, Esq.; Lewis Lee, Esq.

(57) ABSTRACT

A method of reliable radio communication network duplication for a high speed train and a radio communication-based high speed train control system are provided. For the construction of radio communication network duplication of a high speed train control system, radio communication networks can be alternately disposed so that handover delay and disconnection at the interface between communication cells can be prevented during the handover at the same time.

5 Claims, 2 Drawing Sheets

METHOD OF RELIABLE RADIO COMMUNICATION NETWORK DUPLICATION FOR HIGH SPEED TRAIN AND RADIO COMMUNICATION-BASED HIGH SPEED TRAIN CONTROL SYSTEM USING THE SAME

CROSS-REFERENCE TO RELATED APPLICATION

This application claims the benefit under 35 U.S.C. §119(a) of a Korean Patent Application No. 10-2011-0133202, filed on Dec. 12, 2011, the entire disclosure of which is incorporated herein by reference for all purposes.

BACKGROUND

1. Field

The following description relates to radio communication technology, and more particularly, to technology of applying a radio communication network to control a high speed train.

2. Description of the Related Art

Radio communication network duplication for high speed train control systems has been introduced to stabilize a work control system, replacing the conventional trackside radio communication systems. Such radio communication network duplication is embodied by duplication of a trackside radio communication system and duplication of an on-board communication device.

A trackside radio communication system constitutes one communication cell as in mobile communications, and provides a radio access route to an on-board communication device installed in a train that approaches the cell. When the corresponding trackside communication system is problematic, trains disposed in the corresponding cells do not secure the communication access to control the trains, and thus the train operation may be suspended.

Korean Patent Publication No. 2004-0054182 discloses technology of applying an on-board network access service configured to trace the communication access and billing when there are a plurality of radio communication networks.

SUMMARY

The following description relates to a method of reliable radio communication network by duplication of a high speed train control system for a high speed train, which is capable of securing the stability in operation of the high speed train by reducing the risk of handover delay that may be caused at the interface between communication cells, and a radio communication-based high speed train control system using the method.

In one general aspect, a method of applying a radio communication network to control a high speed train includes alternately disposing an upper radio cell of one base station with a is lower radio cell of an adjacent base station and a lower radio cell of the base station with an upper radio cell of the adjacent base station so that the lower radio cell and the upper radio cell can overlap so as to prevent handover delay and disconnection at the interfaces between a plurality of communication network cells.

In another general aspect, a radio communication-based high speed train control system includes base station controllers configured to dispose a directional antenna so that an upper radio cell of one base station and a lower radio cell of an adjacent base station, and a lower radio cell of the one base station and an upper radio cell of the adjacent base station can overlap to alternately dispose the same type of communication cells, a communication network controller connected with the base station controllers and configured to manage connection between a base station and a radio communication terminal configured to control a high speed train through a communication network, and a train system controller connected with the communication network controller and configured to collect railway control information and analyze the collected railway control information.

Other features and aspects will be apparent from the following detailed description, the drawings, and the claims.

Figure 1:
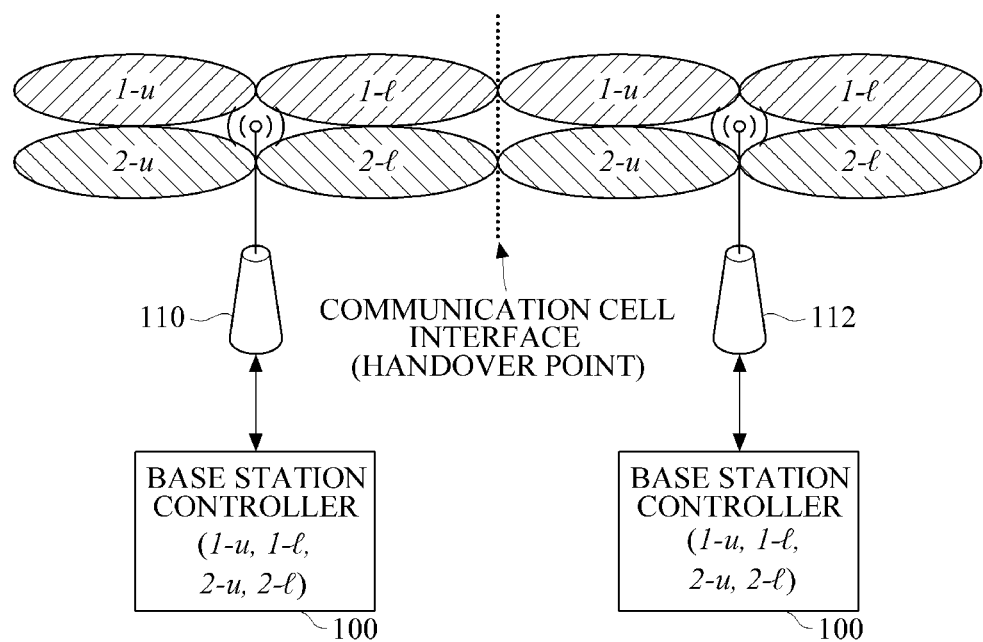
FIG. 1 is a diagram illustrating an example of application of conventional radio communication network duplication for a high speed train.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of application of conventional radio communication network duplication for a high speed train.

Referring to FIG. 1, in the radio communication network for a high speed train, radio communication systems are doubly installed in a trackside system that takes charge of one cell. The duplicate radio communication systems are independently run through different radio channels. In this case, even when problems are caused in one radio communication system, a train may be controlled through the other radio communication system, thereby preventing the train service from being stopped.

However, the above duplication method is configured so that two communication cells can overlap in the same pattern. That is, the same type of communication cells are configured in an overlapping pattern by disposing one base station on two pairs of directional antennas 1-$u$ and 1-$l$ and 2-$u$ and 2-$l$, as shown in FIG. 1. Also, two radio cells 1-$u$ and 2-$u$ or 1-$l$ and 2-$l$ are is configured based on one base station 110 or 112 so that the two radio cells and the one base station can overlap in the same pattern, and thus an upper radio cell and a lower radio cell of each of the radio cells are disposed in an overlapping pattern.

In this case, when communication/propagation environments between the corresponding cell and an adjacent cell are poor, the risk of handover delay may be increased from the communication cell interface that is a handover point. As a result, abnormal operations such as communication disconnection may be caused due to reduction in radio access qualities and channel interference. In the case of a general duplication pattern, the interfaces between the radio cells may be distributed adjacent to each other due to the overlapping radio cell structure. Therefore, problems such as handover delay and communication disconnection may always be caused in two radio communication networks at the same time.

Figure 2:
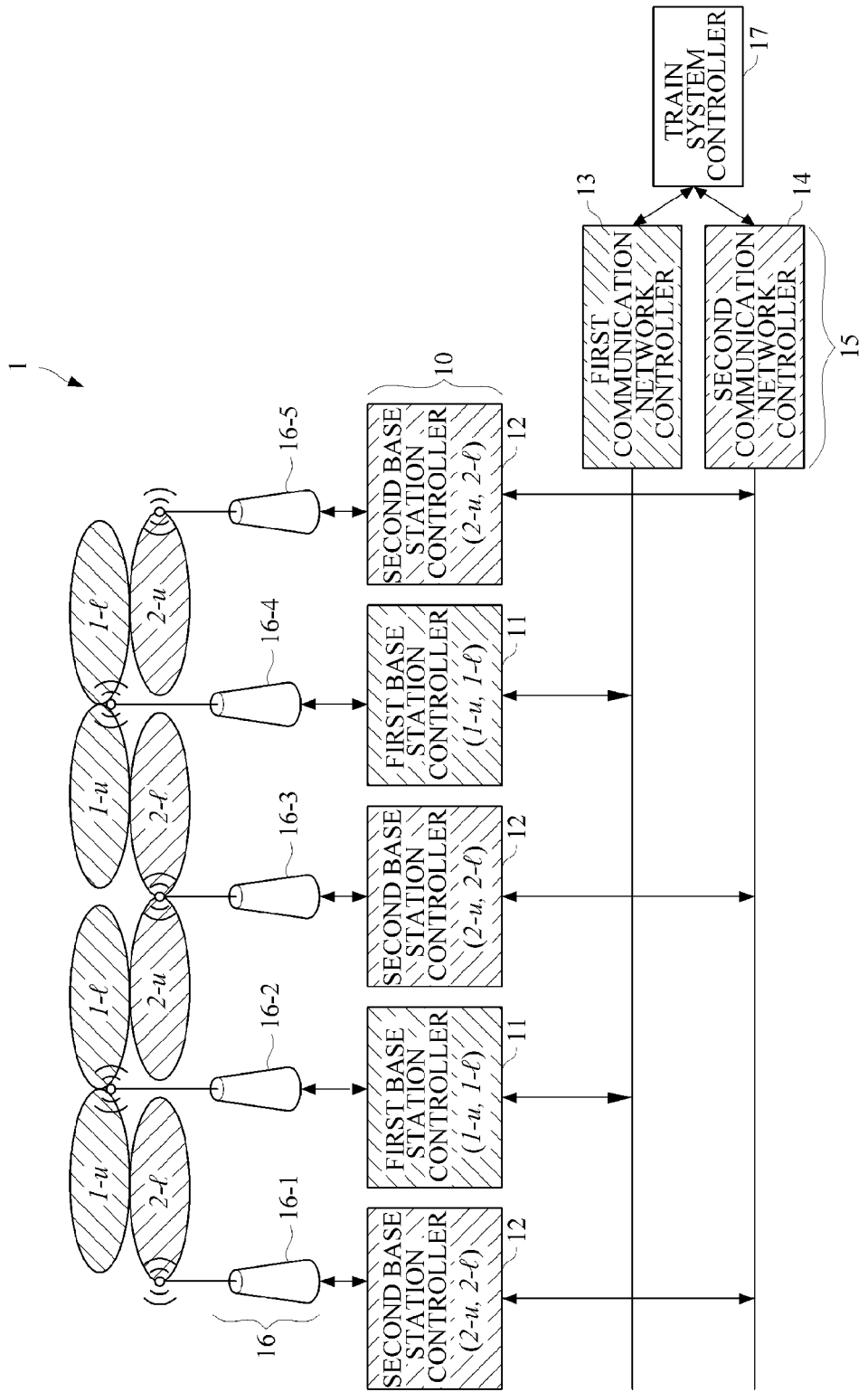
FIG. 2 is a diagram illustrating a high speed train control system using a method of reliable radio communication network duplication for a high speed train according to one exemplary embodiment of the present invention, and an example of application of the high speed train control system.

FIG. 2 is a diagram showing a high speed train control system 1 using a method of reliable radio communication network duplication for a high speed train according to one exemplary embodiment of the present invention, and an example of application of the high speed train control system.

Referring to FIG. 2, the high speed train control system 1 includes base station controllers 10, a communication network controller 15 and a train system controller 17.

Unlike the construction of the conventional mobile communication network, the radio communication network configured to control a high speed train is configured so that a long and narrow layout of the communication cells can be arranged around one base station in parallel along the trackside. That is, the radio communication cells of the high speed train control system 1 overlap a railroad track in a direction in which a high speed train enters a communication cell and approaches a base station (hereinafter referred to as "upper radio cell") and a direction in which a high speed train passes through a base station and goes away from the base station, and leaves a communication cell (hereinafter referred to as "lower radio cell"). As a result, the long, narrow conical cells are arranged in a symmetrical manner. To transmit a radio signal of a communication network composed of these upper and lower radio cells, the communication network is formed through different frequency channels using a pair of symmetrically arranged directional antennas.

To reliably run the radio communication network of the high speed train control system 1, the present invention proposes technology of duplicating a communication network, wherein the duplication is configured to reduce the risk of handover delay that may be caused at the interface of communication network cells. Therefore, the present invention aims to secure the stability of high speed train service by enabling a reliable and continuous communication cable to be secured in the high speed train control system 1 which runs at a rate of more than several hundred kilometers per hour.

More particularly, when the communication network for a high speed train is duplicated, the high speed train control system 1 operates in a mode in which communication networks using different frequency channels are disposed crosswise with adjacent base stations, rather than a typical mode in which communication networks using different frequency channels are disposed around one base station so that the communication networks can overlap in the same pattern.

That is, it is characterized in that an upper radio cell of one base station is disposed crosswise with a lower radio cell of an adjacent base station so that the upper radio cell and the lower radio cell can overlap, and a lower radio cell of the one base station is disposed crosswise with an upper radio cell of the adjacent base station so that the lower radio cell and the upper radio cell can overlap. For example, an upper radio cell 1-$u$ of one base station 16-4 is disposed is crosswise with a lower radio cell 2-$l$ of an adjacent base station 16-3 so that the upper radio cell 1-$u$ and the lower radio cell 2-$l$ can overlap, and a lower radio cell 1-$l$ of the base station 16-2 is disposed crosswise with an upper radio cell 2-$u$ of the base station 16-3 so that the lower radio cell 1-$l$ and the upper radio cell 2-$u$ can overlap, as shown in FIG. 2.

Hereinafter, the constituents of the high speed train control system 1 according to the present invention will be described in further detail with reference to the above-described characteristics of the present invention.

The base station controllers 10 dispose a directional antenna so that an upper radio cell of one base station and a lower radio cell of an adjacent base station, and a lower radio cell of the one base station and an upper radio cell of the adjacent base station can overlap to alternately dispose the same type of communication cells. The communication network controller 15 is connected with the base station controllers 10 to manage connection between the base station 16 and a radio communication terminal configured to control a high speed train through a communication network. The radio communication terminal is a terminal that is positioned on a high speed train to control the high speed train in an on-board manner.

The train system controller 17 is connected with the communication network controller 15 to collect railway control information and analyze the collected railway control information. The railway control information transmitted via each communication network is transmitted to the train system controller 17. Then, the train system controller 17 functions to compare and verify information separately collected through the communication networks, check whether the railroad network works normally and cope with this situation.

According to one exemplary embodiment, the base station controllers 10 include first base station controllers 11, each being configured to control a base station composed of a 1-$u$ radio cell and a 1-$l$ radio cell, and second base station controllers 12, each being configured to is control a base station composed of a 2-$u$ radio cell and a 2-$l$ radio cell. The communication network controller 15 includes a first communication network controller 13 connected with the first base station controllers 11 to manage connection of the radio communication terminal to the base station, and a second communication network controller 14 connected with the second base station controllers 12 to manage connection of the radio communication terminal to the base station. The train system controller 17 collects railway control information separately from the first communication network controller 13 and the second communication network controller 14.

The first base station controllers 11 and the second base station controllers 12 are connected with different communication network controllers. This is because the first base station controllers 11 and the second base station controllers 12 are supplied with a power source via separate communication networks to prevent failure of the power supply or disconnection of the communication networks. That is, the first base station controllers 11 and the second base station controllers 12 are operated based on separate power system networks, and connected respectively to separate communication backbone networks. Therefore, even when a problem such as failure of the power supply or disconnection of the communication networks is caused in one communication network, normal operation of the high speed train control system 1 is secured. The base station controllers 11 and 12 are connected to the communication network controllers 13 and 14, respectively, and each of the communication network controllers 13 and 14 manages connection between the radio communication terminal and the base station by means of the corresponding communication networks.

Hereinafter, one example of application of the method of reliable radio communication network duplication during the handover of the high speed train control system 1 will be described in detail with reference to the above-described construction.

Referring to FIG. 2, when a train runs in the right direction (a direction facing from the is base station 16-1 to the base station 16-5), the train entering the 1-*u* radio cell of the base station 16-2 moves through the base station 16-2 under control of the first base station controllers 11, and is handed over from a central region of the base station 16-2 to the 1-*l* radio cell. In this case, a vulnerable point of radio environments at the interface between the 1-*u* radio cell and the 1-*l* radio cell in the central region of the base station 16-2 is very short, compared with that caused at the interface between the 1-*l* radio cell of the base station 16-2 and the 1-*u* radio cell of the base station 16-4. Also, at a point of time when the train enters the 1-*u* radio cell, the first base station controllers 11 prepare for the handover caused in the 16-2 base station with sufficient time while crossing the 1-*u* radio cell. Therefore, there is no problem regarding the handover.

However, the train that is passing through the 1-*l* radio cell of the base station 16-2 has the high risk of handover delay or failure at the interface between the base station 16-4 and the 1-*u* radio cell due to the poor radio environments. In this case, the corresponding error is a great obstacle for the high speed train control system. Therefore, the present invention aims to support a duplication network through crosswise disposition of the radio cells so as to secure reliable operation of the high speed train control system in a region in which handover delay is possible or during a time required for the base station 16-3 to handle or restore the error of another radio network.

According to one exemplary embodiment, the train system controller 17 determines whether the radio communication terminal connected to the base station 16-3 via the 2-*u* radio cell of the second base station controllers 12 under control of the second communication network controller 14 may be connected to the 2-*u* radio cell of the base station 16-5 via the 2-*l* radio cell of the base station 16-3 when the radio communication terminal approaches the interface between adjacent cells which are managed by the base station 16-3 via the 2-*l* radio cell. Even is when the determination results indicate that the connection via the 2-*u* radio cell of the base station 16-5 is delayed, the radio communication terminal prevents the integrity of the high speed train control system caused by the handover delay or failure of the radio communication terminal by securing reliable radio communication environments in which the radio communication terminal is connected to the base station 16-4 via the 1-*l* radio cell of the first base station controllers 11 for an access delay time.

Meanwhile, it is apparent to those skilled in the art that the above-described embodiment is just one exemplary embodiment to aid in understanding of the present invention, and thus various modifications and changes of the embodiment may be made to employ the reliable radio communication network duplication during the handover.

Therefore, the reliable operation of the high speed train control system 1 can be supported by preventing two duplicated communication networks from having the risk of handover delay at the same time. That is, when a high speed train falling in the range of one radio cell approaches the interface between the one radio cell and an adjacent radio cell, a radio connection through another communication cell is positioned at the center of the corresponding radio cell even when the handover and connection delay is caused due to the poor propagation and connection environments as a handover function is carried out. Therefore, the risk of handover and connection delay may be prevented from being caused at the same time, and the connection problem may be checked and handled for a period of time required for the high speed train to travel at a distance corresponding to a radius of a radio cell whose connection is good.

According to one exemplary embodiment of the present invention, for the construction of radio communication network duplication of a high speed train control system using radio communication networks, the radio communication networks can be alternately disposed so that handover delay and disconnection at the interface between communication cells can be prevented is from being caused during the handover at the same time. Therefore, it is possible to secure the reliable control system operation and continuous communication access environment.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of applying a radio communication network for a high speed train, comprising:

disposing a first base station connected to a first base station controller and a second base station adjacent to the first base station connected to a second base station controller different from the first base station controller and a third base station adjacent to the second base station and connected to the first base station controller; and alternately disposing an upper radio cell of the first base station with a lower radio cell of an the second base station and an upper radio cell of the second base station with a lower radio cell of the third base station so that the lower radio cells and the upper radio cells can overlap so as to prevent handover delay and disconnection at the interfaces between a plurality of communication network cells.

2. A radio communication-based high speed train control system comprising:

a first base station connected to a first base station controller and a second base station adjacent to the first base station connected to a second base station controller different from the first base station controller and a third base station adjacent to the second base station and connected to the first base station controller;

the base station controllers configured to dispose a directional antennas so that an upper radio cell of the first base station with a lower radio cell of the second base station and an upper radio cell of the second base station with a lower radio cell of the third base station so that the lower radio cells and the upper radio cells can overlap so as to prevent handover delay and disconnection at the interfaces between a plurality of communication network cells;

a communication network controller connected with the base station controllers and configured to manage a connection between a base station and a radio communication terminal, wherein the radio communication terminal is configured to control a high speed train through a communication network; and a train system controller connected with the communication network controller and configured to collect railway control information and analyze the collected railway control information.

3. The radio communication-based high speed train control system of claim 2, wherein the base station controllers comprise first base station controllers, each being configured to control a first base station composed of a first upper radio cell and a first lower radio cell and second base station controllers, each being configured to control second base stations, each of which is composed of a second upper radio cell and a second lower radio cell,
wherein the first base station controllers and the second base station controllers are formed alternately with each other,
the communication network controller includes a first communication network controller connected with the first base station controllers and a second communication network controller connected with the second base station controllers, and
the train system controller is configured to collect the railway control information from the first communication network controller and the second communication network controller.

4. The radio communication-based high speed train control system of claim 3, wherein the first base station controllers and the second base station controllers are connected with different communication network controllers, and supplied with a power source via separate communication networks to prevent failure of the power supply or disconnection of the communication networks.

5. The radio communication-based high speed train control system of claim 3, wherein the train system controller determines whether the radio communication terminal connected to the first base station via the second upper radio cell of the second base station controllers under control of the second communication network controller is able to be connected to the second upper radio cell of the second base station via the second lower radio cell of the first base station when the radio communication terminal approaches the interface between adjacent cells which are managed by the first base station via the second lower radio cell, and the radio communication terminal is connected to the first base station via the first lower radio cell of the first base station controllers for an access delay time to prevent handover delay and disconnection of the radio communication terminal even when the determination results indicate that the connection via the second upper radio cell of the first base station is delayed.

* * * * *